United States Patent [19]
Schoonover

[11] 3,818,957  
[45] June 25, 1974

[54] LAND CLEARING AND TREE PLANTING SITE PREPARATION APPARATUS

[75] Inventor: Richard H. A. Schoonover, Mercer Island, Wash.

[73] Assignee: Formac International, Inc., Seattle, Wash.

[22] Filed: Apr. 20, 1972

[21] Appl. No.: 245,972

[52] U.S. Cl............................................. 144/34 R
[51] Int. Cl............................................ A01g 23/02
[58] Field of Search...... 56/255, 256, 295; 144/2 N, 144/34 R, 34 A, 34 B, 309 AC

[56] References Cited
UNITED STATES PATENTS

| | | | |
|---|---|---|---|
| 1,321,044 | 11/1919 | Hurd | 144/2 N |
| 2,404,655 | 7/1946 | Randall | 144/34 A |
| 2,672,171 | 3/1954 | Jones | 144/34 A |
| 2,923,332 | 2/1960 | Osmun | 144/2 N |
| 3,198,224 | 8/1965 | Hiley | 144/2 N |
| 3,343,575 | 9/1967 | Trout | 144/34 R |
| 3,533,458 | 10/1970 | McColl | 144/309 AC |
| 3,550,360 | 12/1970 | Van Der Lely | 56/295 |

Primary Examiner—Gerald A. Dost
Attorney, Agent, or Firm—Christensen, O'Connor, Garrison & Havelka

[57] ABSTRACT

A brush and tree cutting and pulverizing or comminuting apparatus is mounted on a tracked vehicle. The apparatus includes embodiments for ground preparation for tree planting sites. In general, the apparatus has a cutting head which is mounted for movement on an articulated boom which is in turn mounted on the vehicle. The boom is articulated to manipulate the cutting head for lateral, vertical, pitch and roll movements. The cutter head includes a bearing block having a shaft journaled therein. The shaft is driven by a hydraulic motor. A cutting wheel is affixed to the lower free end of the shaft. Preferably the cutting wheel is a massive disc having a plurality of cutting tooth mounting bars arranged in a predetermined configuration on its bottom surface and on its periphery. Cutting teeth are movably attached to the mounting bars. The cutting wheel further includes a plurality of cutting teeth, preferably of two different types, affixed to the top surface of the cutting wheel. Other embodiments of the clearing apparatus include multiple wheels mounted generally for rotation in a horizontal plane on a boom. These cutting wheels can feed pulverized, cleared material to a conveyor for windrowing. The conveyor is attached to the side of the vehicle on which the boom is mounted. Other embodiments of the land clearing apparatus can include multiple booms mounted on the vehicle, each of which has a cutting wheel mounted for rotation thereon. In addition, the apparatus can include a cutting wheel mounted for rotation in a generally vertical plane positioned at least in part above a horizontally cutting wheel. This embodiment of the apparatus can include feeder teeth for driving brush downwardly toward the horizontal cutting wheels.

In another embodiment of the invention a site preparation wheel is attached to a movable boom in turn mounted on a vehicle. The site preparation wheel can be a massive disc mounted on a hub in turn mounted on a rotatable shaft on the head of the boom. A plurality of massive ground and rock cutting teeth are arranged in a predetermined pattern and affixed to the bottom portion of the disc. The disc can include an auger means mounted coaxially with the hub to initially break ground for the preparation wheel, to guide the ground and rock cutting teeth into appropriate engagement with the site being prepared, and to excavate a planting hole for a tree. The site preparation wheel can also include a plurality of elongate blades mounted on the wheel or hub. The blades have a ground-engaging elongate cutting surface on the bottom thereof. A shroud can be affixed to the outer portion of these elongate blades to retain dirt or earth removed by the blades at the site rather than spewing the loosened dirt aside.

33 Claims, 50 Drawing Figures

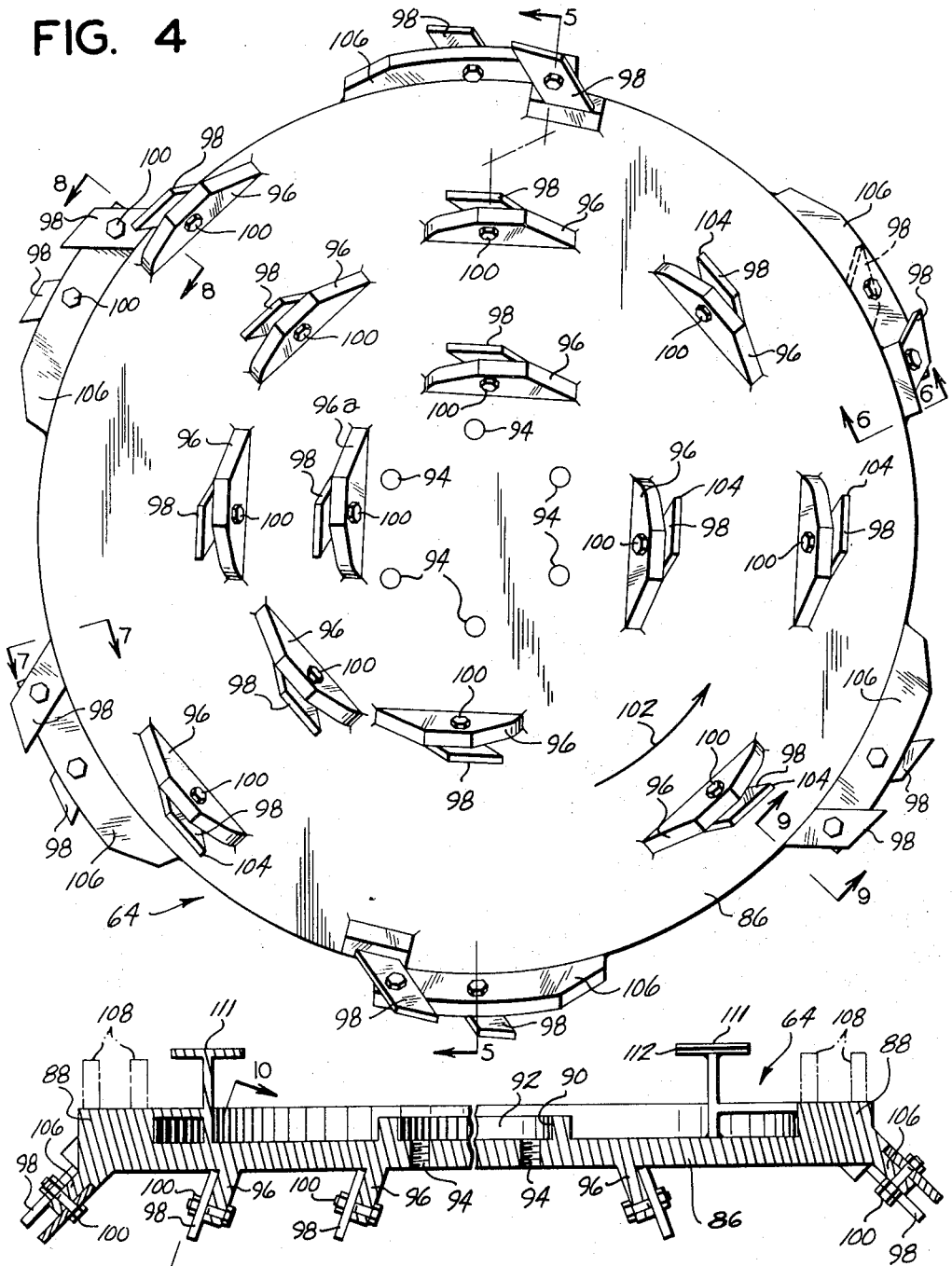

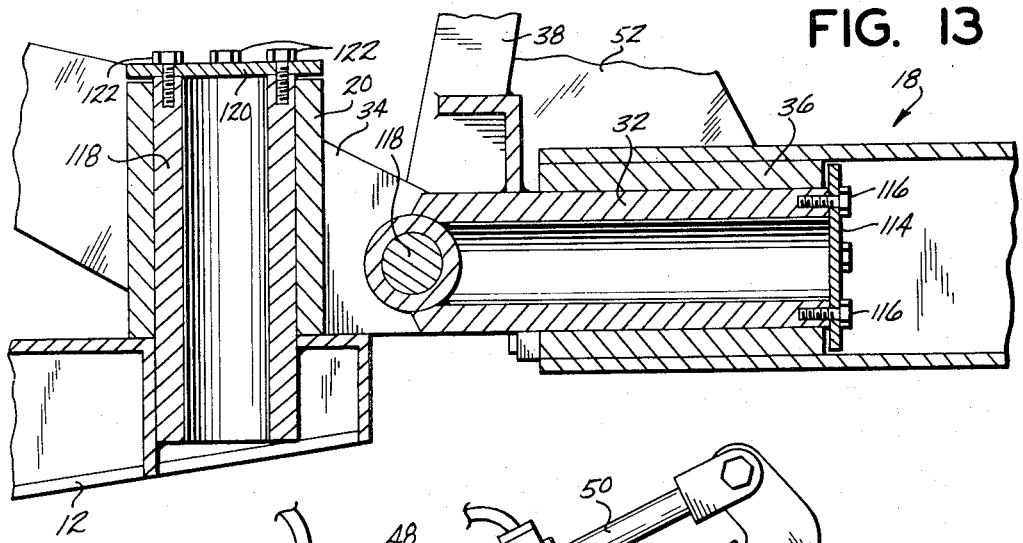
FIG. 13
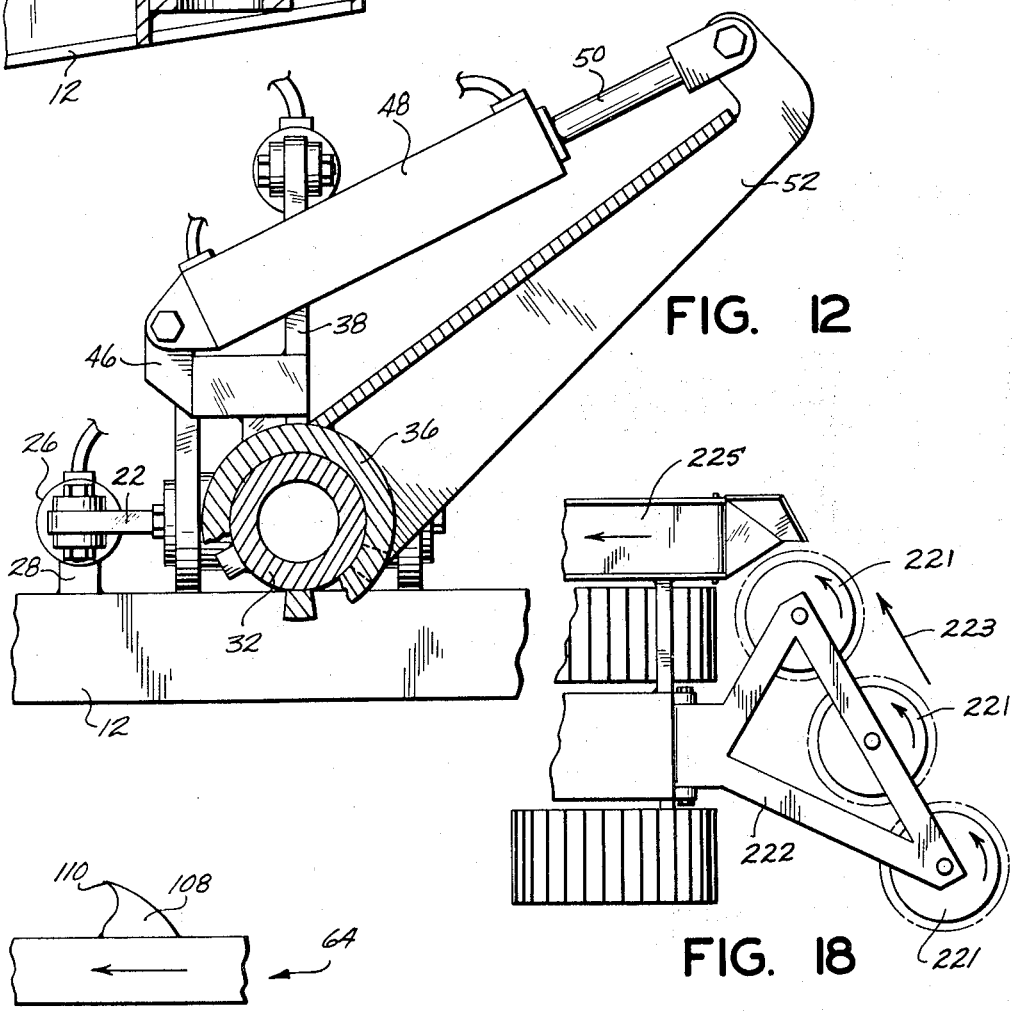
FIG. 12
FIG. 18
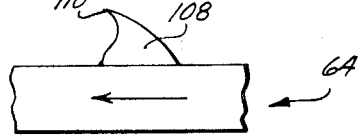
FIG. 11

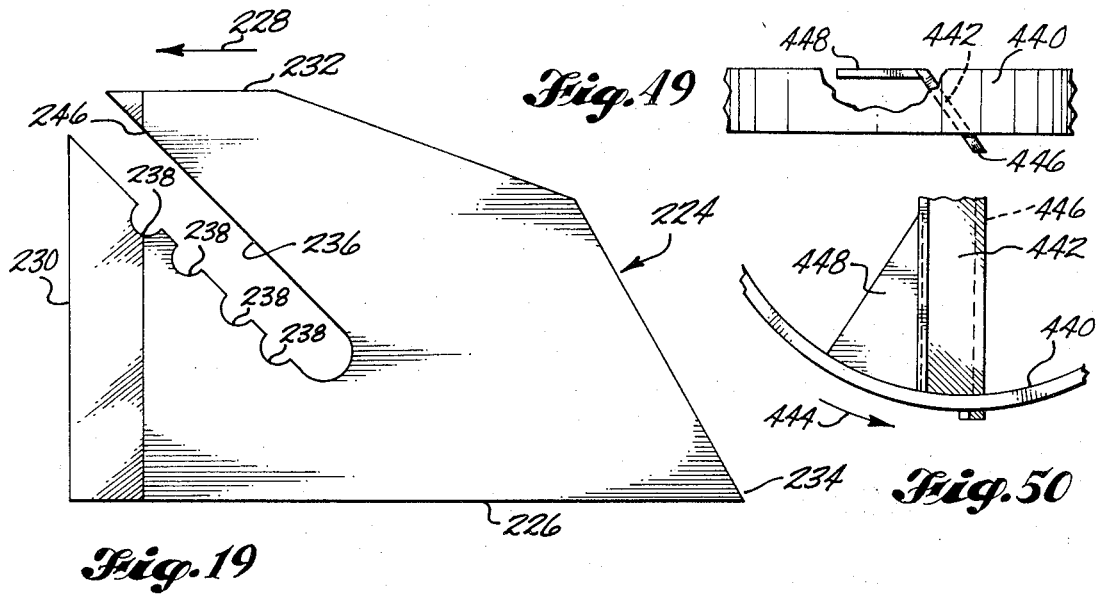
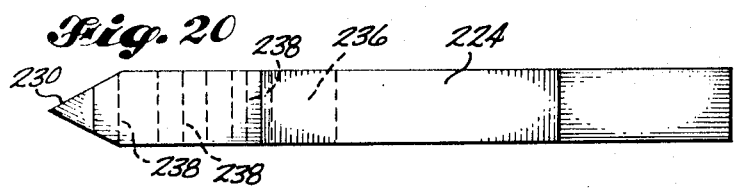
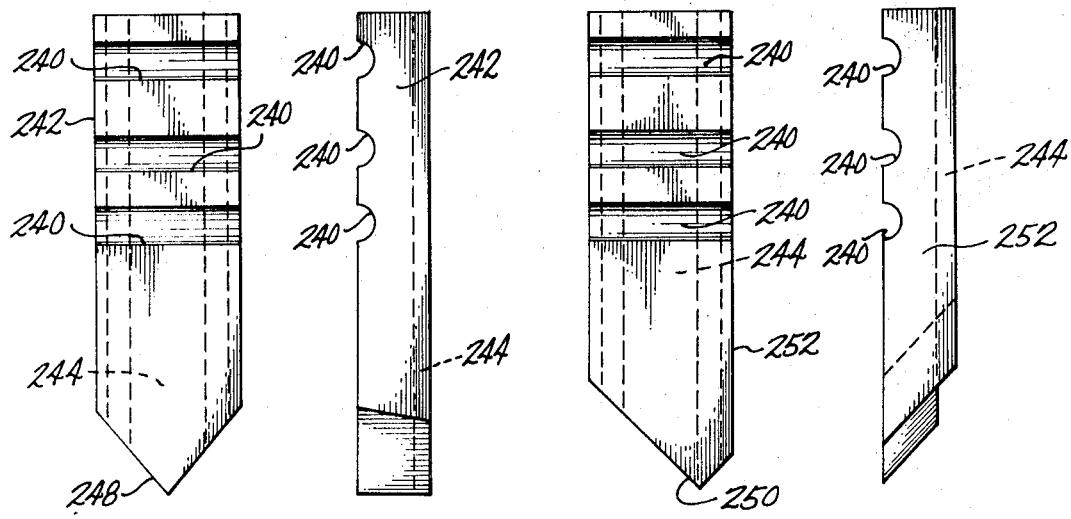
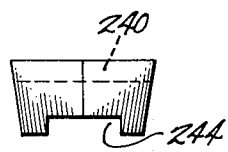
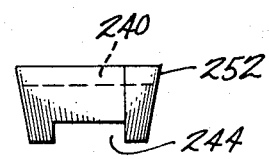

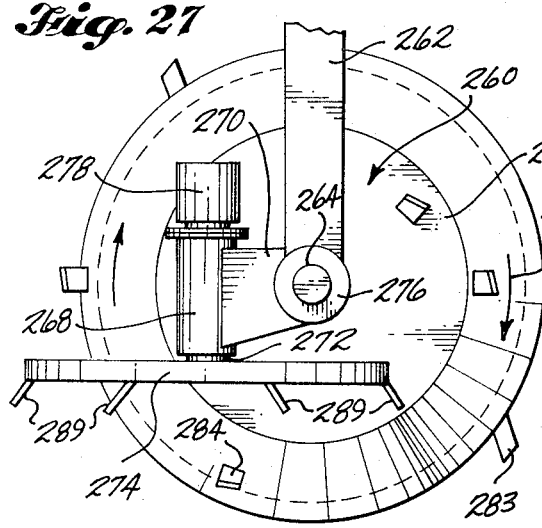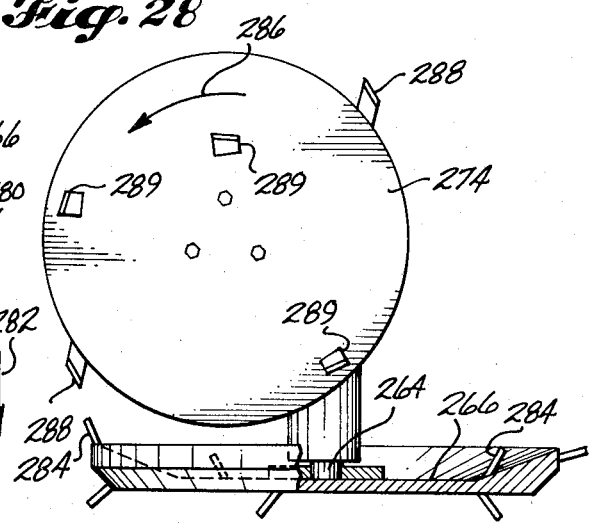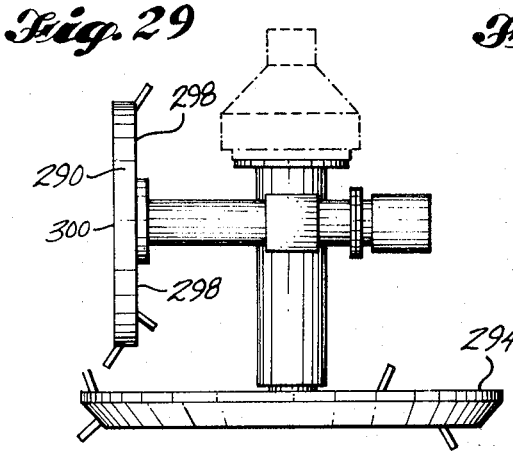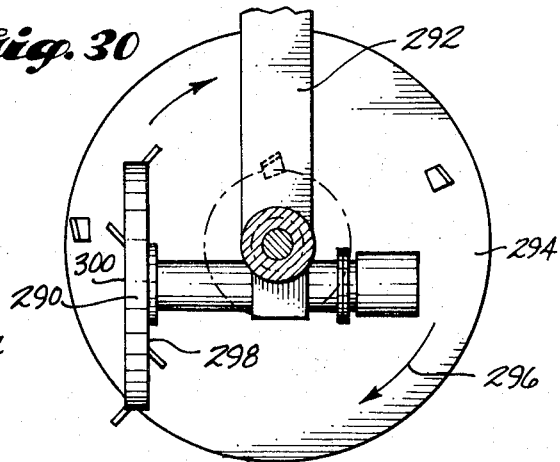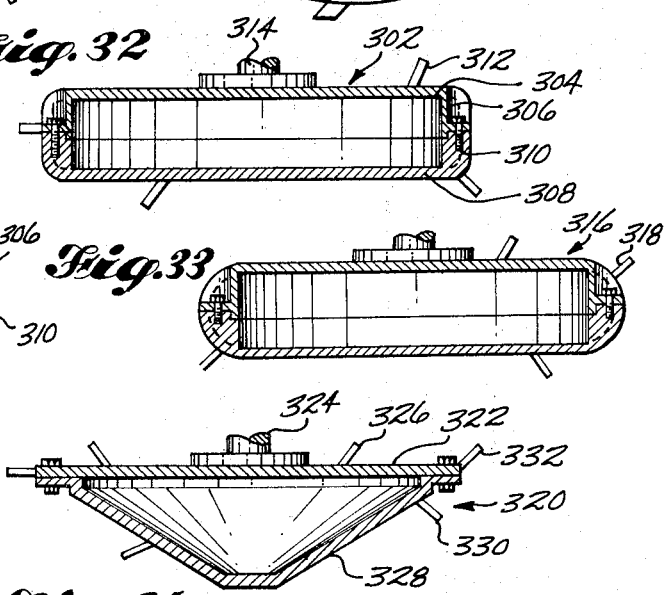

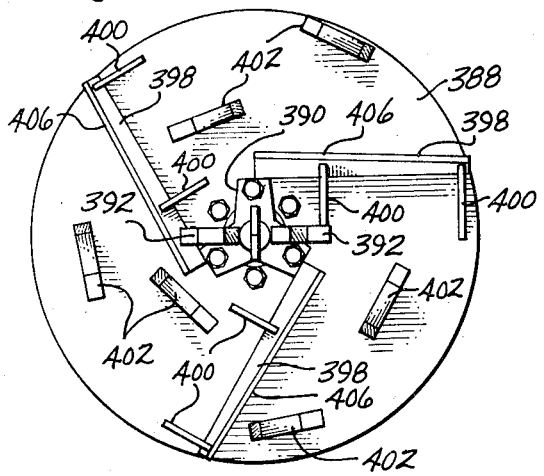
Fig. 40
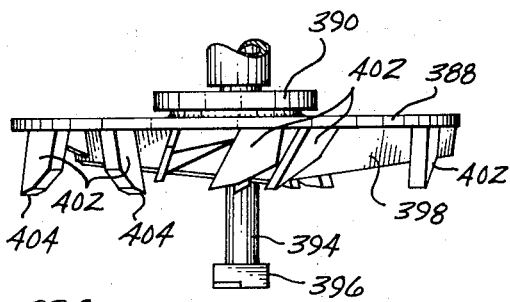
Fig. 41
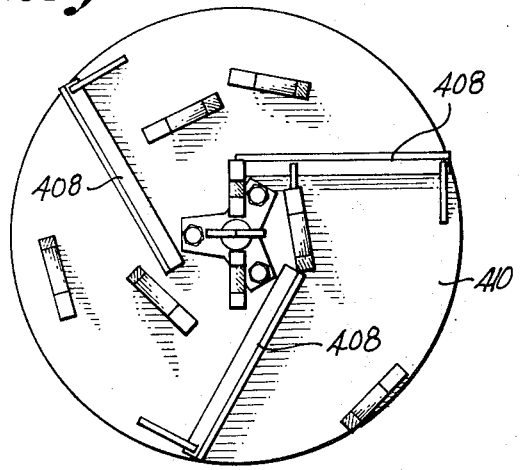
Fig. 42
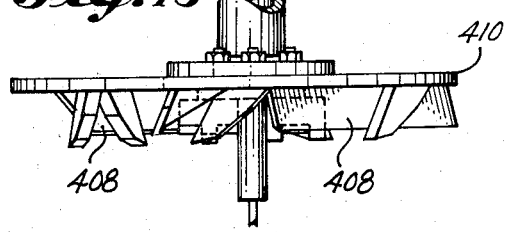
Fig. 43
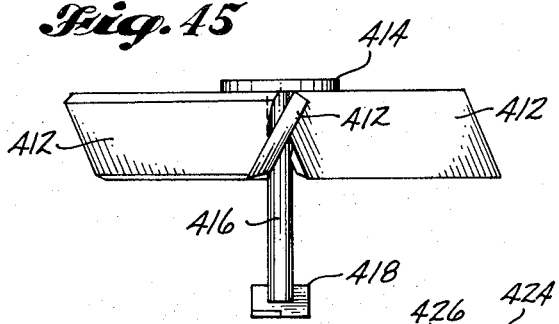
Fig. 45
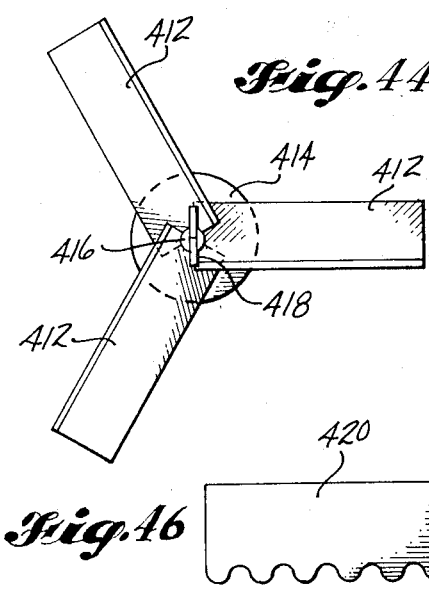
Fig. 44
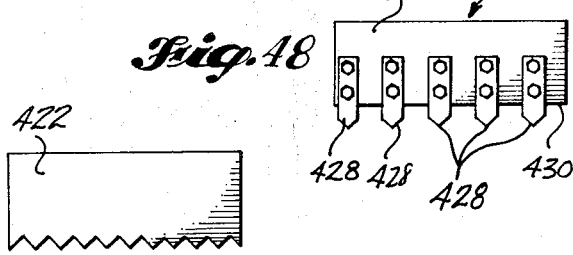
Fig. 48
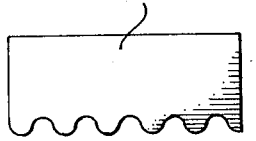
Fig. 46
Fig. 47

LAND CLEARING AND TREE PLANTING SITE PREPARATION APPARATUS

BACKGROUND OF THE INVENTION

This invention relates to land clearing and tree planting site preparation apparatus, and more particularly, to boom means for mounting a cutting wheel and site preparation wheel on a vehicle, to the configuration and construction of a land clearing cutting wheel, and to the configuration and construction of a site preparation wheel.

When logging a large area, especially when selectively logging the area, it is necessary to prepare skid trails for hauling and skidding of logs to a primary distribution location. At present large bulldozers with blades are utilized for clearing skid trails and the like. The bulldozers enter a forested area and literally push trees and brush from the trail being cleared. This method of clearing has several disadvantages. For example trees and brush removed from the skid trail must be piled alongside of the trail and generally are left as unusable timber. These brush piles must be ultimately burned or otherwise destroyed to leave the logged area in condition for replanting. The burning and piling of brush and trees consumes much time, presents the possibility of forest fire, and generally renders the burning sites unusable for a period of time. Another disadvantage of the present-day method of clearing skid trails is that when a bulldozer approaches a tree, the tree is either broken off or is uprooted. If broken off, the stump must be removed, most conveniently by uprooting. When a stump is uprooted, a hole usually remains, requiring regrading of the skid trail. Furthermore, no root structure is left to hold the ground under the skid trail in place, thus increasing the possibility of erosion which requires additional work to prepare the skid trail for replanting. Furthermore, the use of bulldozers to clear skid trails consumes much time and requires relatively large equipment contributing to increased capital investment and labor costs.

Objects of the present invention which will alleviate or eliminate the foregoing and other disadvantages are to provide a multipurpose tool: for clearing brush, trees, stumps, logs and dirt for logging skid trails; for clearing roadside brush, logs and stumps, for clearing road right-of-ways, utility right-of-ways, and railroad right-of-ways; for precommercial thinning of timber stands; for clearing unwanted stumps, logs and the like in recreational areas; for clearing brush and unwanted trees or stumps in timber stands or farm lands. Further objects of the invention are: to provide a tool which is readily attachable to present-day log skidders already employed in the logging industry; to provide a tool which has the ability to cut to ground level stumps, logs, trees, brush and the like; to provide a tool which will pulverize the stumps, logs, trees and brush to a chip size for a roadbed; to provide a tool which leaves the root structure of the plants being cleared in the ground so that significant immediate erosion will not develop; to provide a tool which does not require excessive vehicle tractive power, thus eliminating the ruts produced by bulldozers and the like in wet areas or during the rainy seasons; to provide a tool which will assist in preventing ground damage by vehicles from an ecological standpoint, i.e., by preventing mud and excessive runoff from entering streams, by preventing topsoil loss by erosion, and by leaving an area with generally good aesthetics as contrasted with previous methods; to provide a low-cost tool which can be attached to a wheeled tractor or skidder or to a light-duty tracked vehicle rather than requiring a heavy bulldozer; to provide a tool for brush control and site preparation for tree planting; and to provide a tool which will eliminate slash burning by pulverizing the slash and spreading it over the ground after an area has been logged.

Heretofore brush and stump cutters have been available. However, no apparatus has been available which has the ability to chop all wood or cellulosic fibrous material found in a given area. Neither has a cutting and pulverizing tool been available which has sufficient dexterity to conveniently reach and chop brush, stumps, logs and the like on any terrain over which vehicles can travel. Further no brush cutting equipment exists which has the flexibility to cut and dispose of brush, stumps and the like in a single pass over the area. The present invention fills these needs.

Further objects of the present invention include: provision of a hydraulically controlled boom mounted on a vehicle which can be controlled to approach a given goal at any desired working angle; provision of a tool with sufficient mass and weight when spinning rapidly to cut through eight or ten inch or larger trees or stumps in a very small amount of time, on the order of one second; provision of a tool which has quick adjustment and/or removal of teeth for wear compensation, resharpening and replacement; provision of a tool with properly spaced teeth so located that each is cutting an individual swath and not trailing in the same locus or track as another tooth; location and spacing of teeth on a cutting wheel so that each is performing an optimum amount of work without requiring excess motive power, so that debris cannot become wedged or trapped beteen two or more teeth, and so that debris will be thrown away from the tooth and wheel; provision of a tooth cutting edge requiring a minimum of power to cut through solid wood; provision of teeth so mounted that a proper cutting angle is assured for a maximum cut with minimum power; provision of a tool with teeth so designed and mounted that the shock of hitting a solid object such as a rock will not break the tooth or tooth mounting or damage the cutting wheel; provision of a tool with a tooth guide leading the tooth in its cutting path to protect it from rock and other hard objects and furthermore acting as a cutting depth limiter for the teeth.

Still further objects of the present invention are: to provide a low speed cutting wheel to minimize flying debris thrown from the cutting wheel and to maintain the flying debris at a reasonably safe level as opposed to that encountered with prior art rotary grass mowers or brush cutters; to provide cutting teeth on the top of a cutting wheel for cutting limbs, trees and debris which may fall upon the wheel; to provide teeth located on the top of a cutting wheel so designed and located to that limbs, trees and other debris are pulled into the center of the wheel for complete and rapid cutting and disposal; to provide a frame guard for mounting on the vehicle in conjunction with a boom which will direct brush and limbs onto the cutting wheel and prevent them from interfering with operation of the vehicle or injury of the operator of the vehicle.

When preparing logged areas for replanting or reforesting, it has been found necessary in some areas of the country to terrace hillsides, especially those with southern exposure, so that snow runoff will be restrained to provide moisture for seedlings, and furthermore, to orient seedlings with respect to the sun at an angle at which substantial sun damage will not occur. Presently large terraces are utilized to accomplish this end. In addition to the terracing, the ground around the seedling must be worked to provide proper soil conditions for root growth of the seedling. Presently soil is prepared by hand or not at all. These methods result in poor initial growth rate of seedlings and also cause a relatively large seedling attrition rate.

Therefore, additional objects of the present invention are: to provide a tree planting site preparation tool which can be conveniently and removably mounted on a log skidding vehicle or the like; to provide a tool which can be oriented to provide a tree planting site on any terrain which can be traversed by a vehicle; to eliminate the need for terracing of hillsides and mountainsides; to provide a planting site preparation tool which will maintain the original terrain on the major portion of an area to be reforested; to provide a tool for preparing tree planting sites without disturbing substantial amounts of natural grass and other foilage; provide a planting site preparation tool which will not contribute to site erosion in an area being reforested; to provide a tool which will quickly and efficiently remove grass and brush from the site being prepared.

SUMMARY OF THE INVENTION

The present invention provides a landing clearing apparatus which comprises an articulated support means capable of attachment to a land vehicle. The articulated support means includes an elongate boom having a free end, a cutting wheel carrier attached to the free end of the boom and a shaft journaled in the carrier. A cutting wheel means is affixed to the shaft. The cutting wheel means comprises a plate having a plurality of cutting members affixed to and projecting downwardly and outwardly from the bottom and the periphery thereof. At least one cutting member is also mounted on and projects upwardly from the top of the plate. A motor for rotating the shaft is mounted on the cutting wheel carrier.

Another aspect of the present invention provides a land clearing apparatus comprising a land vehicle having ground-engaging motive means thereon. A boom means is mounted at one end of the vehicle and includes first and second bearing blocks mounted on the free end thereof. Each of the bearing blocks have a shaft journaled thereon which carries a cutting wheel means having a plurality of teeth mounted on the bottom and periphery thereof. The shaft on the second bearing block is oriented at approximately a right angle relative to the shaft on the second bearing block and is positioned to locate the cutting wheel means on the second bearing block over the cutting wheel means on the first bearing block. The boom means is movable to vary the orientation of the first shaft from a primarily vertical position to various angular positions relative to the orientation of the vehicle. Hydraulic motor means are employed for rotating the shafts.

Another aspect of the present invention provides a brush and tree clearing and cutting wheel comprising a mounting plate means having a hub capable of attachment to a rotatable shaft. The mounting plate means has a generally circular shape and has top, bottom and peripheral portions. A first plurality of cutting teeth are mounted on the bottom portion of the wheel, a second plurality of cutting teeth are mounted on the peripheral portion of the cutting wheel, and a third plurality of cutting teeth are mounted on the top portion of the wheel.

In still another aspect, the present invention also provides a clearing, thinning and slash disposal apparatus. The apparatus includes a support means having a base member and an elongate boom having a supported end and a free end. A first means mounts the supported end of the boom for pivotal movement about a first axis so oriented relative to the support means to mount the free end of the boom for movement in a vertical direction. A second means mounts the supported end of the boom for pivotal movement about a second axis transverse to the first axis and so oriented relative to the support means to mount the free end of the boom for movement in a lateral direction. A tool carrier is mounted by third means on the free end of the boom for pivotal movement about a third axis transverse to the boom. A means is provided to selectively position the tool carrier at various positions about the third axis. A disc shaped cutting tool is mounted on the tool carrier for rotation about a fourth axis transverse to the third axis. The cutting tool has a top, a bottom, and a periphery with cutting members affixed to and projecting from the bottom and periphery. A motor means is mounted on the tool carrier for rotatably driving the cutting tool. In addition the apparatus can include a fourth means for mounting the supported end of the boom for rolling movement about a generally longitudinal axis with respect to the boom.

BRIEF DESCRIPTION OF THE DRAWINGS

A better understanding of the present invention can be acquired by a reading of the ensuing specification in conjunction with the accompanying drawings wherein:

FIG. 3 is a cross-sectional view of FIG. 1 taken along section line 3—3;

FIG. 4 is an enlarged bottom view of the cutting wheel taken along line 4—4 of FIG. 1;

FIG. 5 is a cross-sectional view taken along section line 5—5 of FIG. 4;

FIGS. 6, 7, 8, 9, and 10 are enlarged views of the teeth and mounting bars for the bottoms and peripheral portions of the cutting wheel taken along section lines 6—6 through 10—10 of FIGS. 4 and 5.

FIG. 11 is an enlarged view of one of the cutting teeth on the top of the wheel shown in FIG. 1;

FIG. 12 is an enlarged view in partial cross section of the boom taken along section line 12—12 of FIG. 1;

FIG. 13 is an enlarged view in partial cross section of the boom taken along section line 13—13 of FIG. 2;

FIG. 18 is a plan view of a fifth embodiment of the land clearing apparatus;

FIGS. 19 and 20 are elevation and plan views, respectively, of a second embodiment of the mounting block for cutting teeth of the present invention;

FIGS. 21 through 23 are views of one type of cutting teeth to be used with the mounting block illustrated in FIGS. 19 and 20;

FIGS. 24 through 26 are views of a second type of cutting teeth to be used with the mounting block of FIGS. 19 and 20;

FIGS. 27 and 28 are plan and elevation views, respectively, of a sixth embodiment of the land clearing apparatus;

FIGS. 29 and 30 are elevational and plan views, respectively, of a seventh embodiment of the land clearing apparatus;

FIGS. 31 and 32 are views of an eighth embodiment of the cutting wheel of the present invention;

FIG. 33 is a cross-sectional view of another embodiment of the cutting wheel;

FIG. 34 is a cross-sectional view of another embodiment of the cutting wheel;

FIGS. 40 and 41 are bottom and elevation views of a third embodiment of the site preparation wheel;

FIGS. 42 and 43 are bottom and elevation views of a fourth embodiment of the site preparation wheel;

FIGS. 44 and 45 are bottom and elevation views of a fifth embodiment of the site preparation wheel of the present invention; and FIGS. 46, 47, and 48 are different embodiment of the cutting edges to be utilized on the blades of the site preparation wheel shown in FIGS. 39 through 45.

FIGS. 49 and 50 are views of a sixth embodiment of the site preparation wheel.

DESCRIPTION OF PREFERRED EMBODIMENTS

Figure 1:
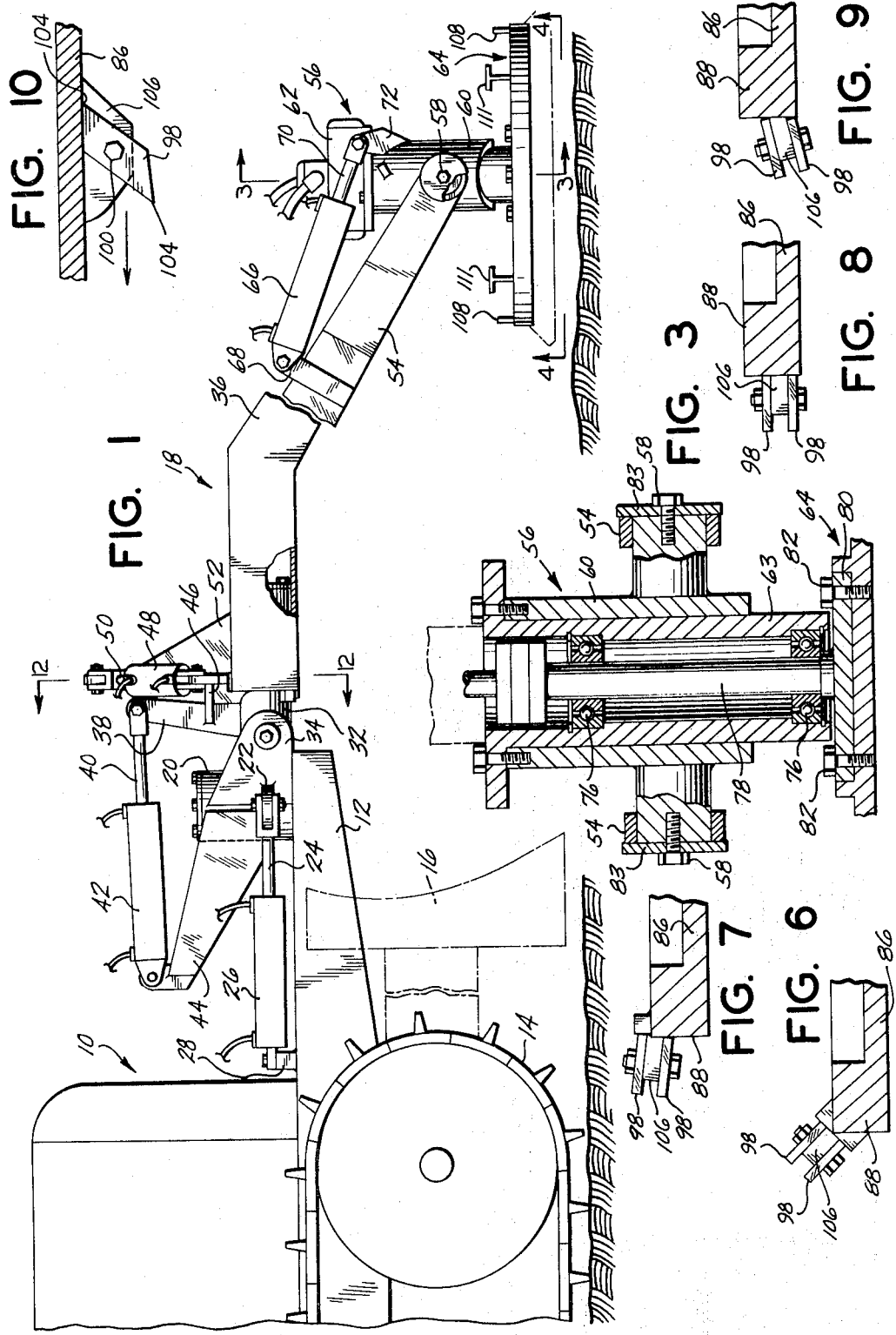
FIG. 1 is an elevation view of the boom of the present invention mounted on a tracked vehicle having a cutting head attached thereto.
Figure 2:
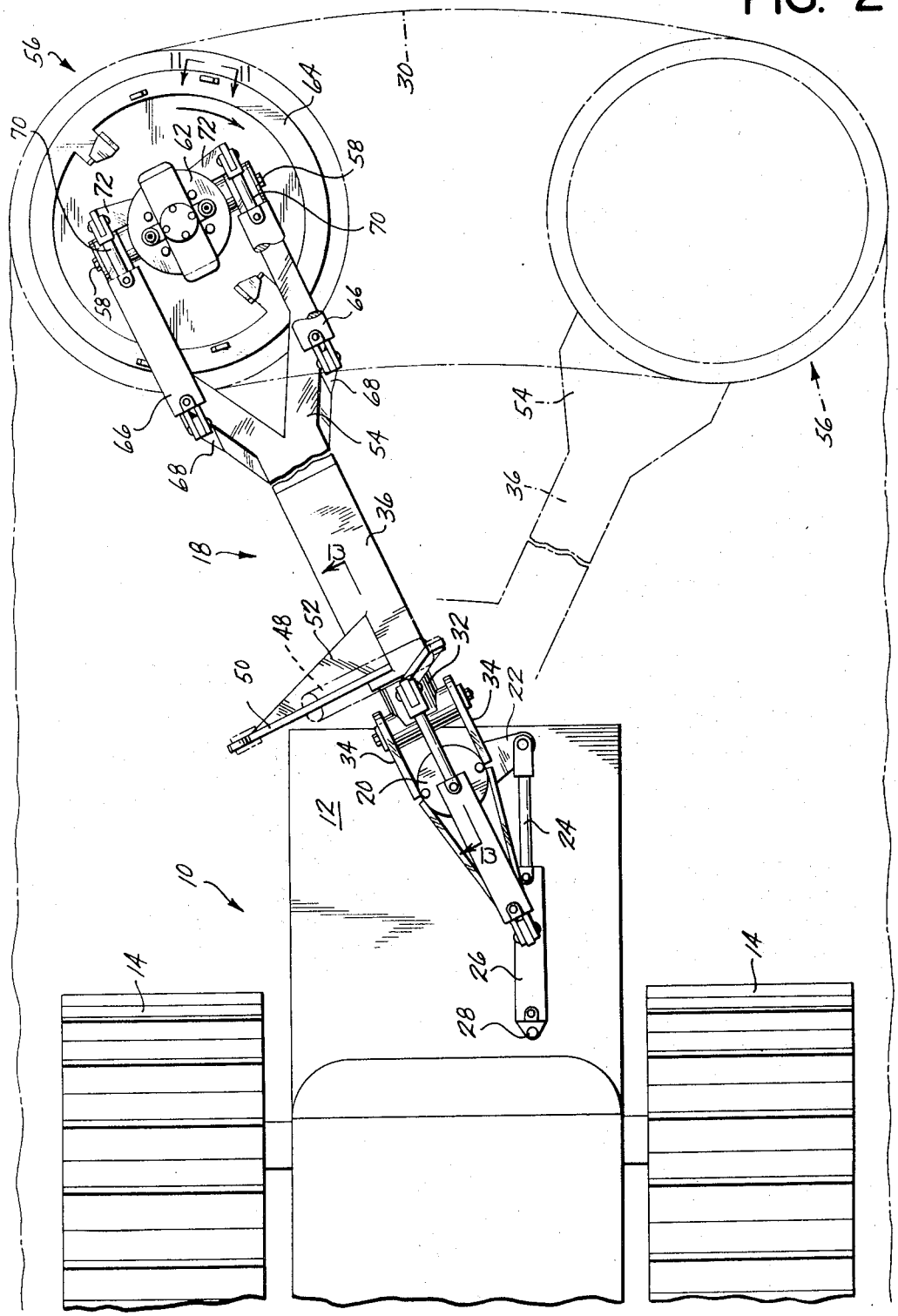
FIG. 2 is a plan view of the apparatus of FIG. 1.

Referring jointly to FIGS. 1 and 2 a vehicle, generally designated 10, includes a forwardly extending frame 12 supported by ground-engaging means 14, preferably of the track-laying type. If desired an auxiliary blade 16 can be mounted on the forward portion of the vehicle 10. A boom, generally designated 18, is mounted on the forwardly extending portion of frame 12. The boom 18 is mounted on the frame 12 by base member 20. The base member 20 is described in detail in later FIGURES.

A flange 22 extending laterally from the base member 20 is pivotally connected to a piston arm 24 of a hydraulic cylinder 26. Hydraulic cylinder 26 is pivotally mounted by pin 28 to the frame 12. The entire boom 18 can be swung laterally through a path indicated by dot-dash lines 30 in FIG. 2. Preferably the lateral path 30 extends beyond the sides of the ground-engaging means 14 of the vehicle 10.

The center section of the boom 18 includes a rearward portion 32 pivotally mounted to forwardly extending flanges 34 on base member 20. A forward portion 36 of the boom 18 is rotatively journaled on the rear portion 32. An upwardly extending flange 38 affixed to the rearward portion 32 of the boom 18 is pivotally connected to a piston rod 40 of hydraulic cylinder 42. Hydraulic cylinder 42 is connected to a flange 44 rearwardly extending from base member 20. The rear portion 32 of boom 18 can be elevated or lowered by hydraulic cylinder 42. A second flange 46, also connected to forward portion 32 of the boom 18, is pivotally connected to hydraulic cylinder 48. Piston arm 50 of cylinder 48 is pivotally connected to a flange 52 in turn connected to the forward portion 36 of the boom 18. Thus the forward portion 36 of the boom 18 is powered for rotation about the rear portion 32 by actuating hydraulic cylinder 48.

A yoke 54 is attached to the forward portion 36 of the boom 18. A cutting head generally designated 56 is pivotally attached to the yoke 54 by pins 58. The cutting head 56 generally includes a bearing block 60 in which a shaft (shown in detail later) is journaled. A hydraulic motor 62 is mounted on the top of bearing block 60 for rotatively powering the shaft. A cutting wheel, generally designated 64, is connected to the downwardly extending free end of the shaft. A pair of hydraulic cylinders 66 are pivotally connected to flanges 68 extending upwardly from the yoke 54. The piston arms 70 of the cylinders 66 are pivotally attached to arms 72 attached to bearing block 60. Cutting head 56 is powered for movement about pins 58 by actuation of the hydraulic cylinders 66.

FIG. 3 is a partially broken away cross-sectional view of the cutting head 56. Bearing block 60 is composed of an outer portion and an inner portion 63, inside which bearings 76 are mounted. A shaft 78 is journaled in the bearings 76 and connected to hub 80. The cutting wheel 64 is attached to hub 80 by fasteners 82. The outer portion of the bearing block 60 is fastened to the arms of yoke 54 by the pins 58 and retention rings 83.

As previously stated, the shaft driving the cutting head is powered by a hydraulic motor. In a preferred embodiment of the invention the hydraulic motor rotates the cutting head at a speed of between 400 and 800 rpm. This rotational speed combined with the mass of the wheel allows sufficient and quick operation of the cutting wheel as it encounters not only brush but medium sized trees having a diameter of 8 to 12 inches. The hydraulic motor is powered, of course, from a hydraulic pump mounted on the vehicle. Likewise the hydraulic cylinders which manipulate the boom 18 are powered from a hydraulic pump mounted on the vehicle. Since a hydraulic source is most convenient for manipulation of the boom it is also convenient to use that source for driving the cutting wheel. In addition the hydraulic motor is preferred over other drives such as an electric motor, chain drive or mechanical drive shaft arrangement since greater flexibility is obtained while requiring less expensive and more reliable equipment in the power train. Under the appropriate circumstances, however, other drive systems can be employed with the invention.

The preferred cutting wheel 64 of the present invention is shown in bottom view in FIG. 4. Cross-sectional views of various portions of the cutting wheel 64 are shown in FIGS. 5 through 11. Cutting wheel 64 preferably is composed of a precast disc 86 which has an annular upwardly extending flange 88 around its periphery. A flange 90 defines a recess 92 in the central portion of the disc 86 into which the hub 80 (FIG. 3) fits. Threaded holes 94 are provided for the fasteners 82.

A plurality of tooth holders or bars 96 are mounted on the bottom side of the disc 86. Preferably tooth holders 96 are of shaped bar stock welded to the disc 86. As can be seen, tooth holders 96 are positioned in an outwardly spiraling pattern on the bottom of the disc 86. Tooth holder 96a is positioned closest the center of disc 86. Tooth holder 96 is progressively spaced a greater distance radially outwardly from the previous tooth holder. Tooth holders 96 are furthermore positoned at a slight angle from the vertical, sloping outwardly toward the periphery of the disc 86. Teeth 98 are connected to holders 96 by fasteners 100. Fasteners 100 are preferably easily removable bolts. The positioning and pattern of the tooth holders 96 and thus the teeth 98 provide an effective cutting area which is substantially the same as the area of the disc 86. All of the effective area of the bottom surface of the disc 86 is utilized.

The preferred teeth 98 are generally of the parallelepiped configuration. Because wheel 64 is designed for rotation in the direction of arrow 102, teeth 98 are positioned so that the leading edge of the cutting surfaces 104 thereof are facing in the direction of rotation. Teeth 98 are designed with two cutting edges, a first cutting edge 104 exposed above the tooth holder 96 and a second cutting edge which rests against the bottom surface of the disc 86. See also FIG. 10. Thus, a reserve cutting edge is maintained in a protected state against the bottom surface of the disc 86 while the upper exposed cutting edges 104 are in use. When replacement of teeth 98 is required, they may be merely rotated 180° after loosening the fasteners 100.

A second series of tooth holders 106 are affixed to the peripheral portion of the annular flange 88 on disc 86. Tooth holders 106 are arranged at serially varying angles which can be seen by reference to FIGS. 5, 6, 7, 8, and 9. Teeth 98, identical to those utilized on the bottom of the cutting wheel 64, are mounted on each one of the peripheral tooth holders 106 by fasteners 100. Preferably, tooth holders 106 are elongate as can best be seen in FIG. 4 and have a pair of teeth 98 mounted one on each side of the holder 106. The combination of the differing mounting angles of the holders 106 and the tooth pairs 98 mounted on each one of the holders 106 provide a large effective cutting swath. The swath ranges from the lower reach of the teeth 98 mounted on the bottom of the wheels 64 arcuately around the periphery of the cutting wheel 64 and continue to the upper reach of teeth 108 and 111 mounted on the upper surface of the wheel 64. Thus the peripherally mounted teeth 98 are very effective for cutting through relatively thick brush and can also effectively cut through trees having a diameter of from 8 to 12 inches.

Since the primary cutting load is carried by the bottom and peripheral teeth 98, teeth 108 and 111 can be permanently affixed to the top of the cutting wheel 64 since they will last as long as the life of the cutting wheel itself. Two types of teeth are mounted on the top of the cutting wheel 64. The first type is a vertically extending ripping tooth 108 shown in FIG. 11. The ripping tooth has a forwardly pointing cutting edge 110 which will cut through any brush, trees or the like falling on top of the wheel 64. The second type of tooth 111, also permanently affixed to the top of the wheel 64, has a cutting edge 112 which faces in the direction of rotation of the cutting wheel 64. Cutting edge 112 is generally parallel to the plane of rotation of the cutting wheel 64 to effectively cut through brush, branches and trees which are deposited on the top of the wheel.

FIG. 12 is a cross-sectional view taken along section line 12—12 through the boom 18 of FIG. 1. The rearward portion 32 of the boom 18 is journaled inside the forward portion 36 of the boom 18. The forward section 36 is powered for rotation about rearward section 32 by means of the hydraulic cylinder 48 and piston arm 50 connected to flange 52 attached to the forward portion 36. Hydraulic cylinder 48 is connected to the flange 46 in turn connected to flange 38 and the rear portion 32 of the boom 18.

FIG. 13 is a cross-sectional view taken along section line 13—13 of FIG. 2 showing the detail of the boom structure and base member. As can be seen by reference to FIG. 13 the rearward portion 32 of the boom 18 is retained in the forward portion 36 by retention plate 114 connected to rear portion 32 by fasteners 116. Rear portion 32 is journaled on the flange 34 by pivot bar 118. The base member 20 is a tubular member which is rotatably mounted over a vertical standard 118 firmly affixed to the forward end of frame 12. Base member 20 is retained on standard 118 by retention plate 120 and fasteners 122. The construction of boom 18 and the manner in which it is mounted on the vehicle 10 provide for manipulation of the cutting wheel 64 about four axes. The dexterity of the boom provides great flexibility. This flexibility is most useful when steep or undulating terrain is encountered. In addition the cutting head can be manipulated to clear brush, overhanging trees or the like in a vertical direction along the sides of trails or other areas being cleared.

Figures 15, 17:
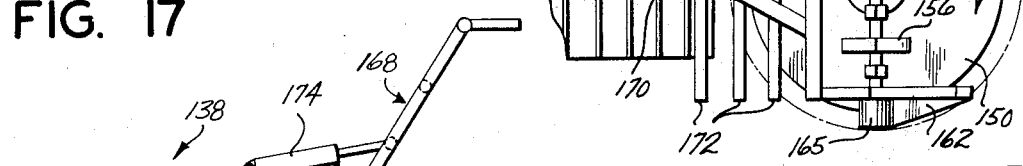
FIG. 15 is a plan view of the embodiment illustrated in FIG. 14.
FIG. 17 is a plan view of a fourth embodiment of the land clearing apparatus.
Figure 14:
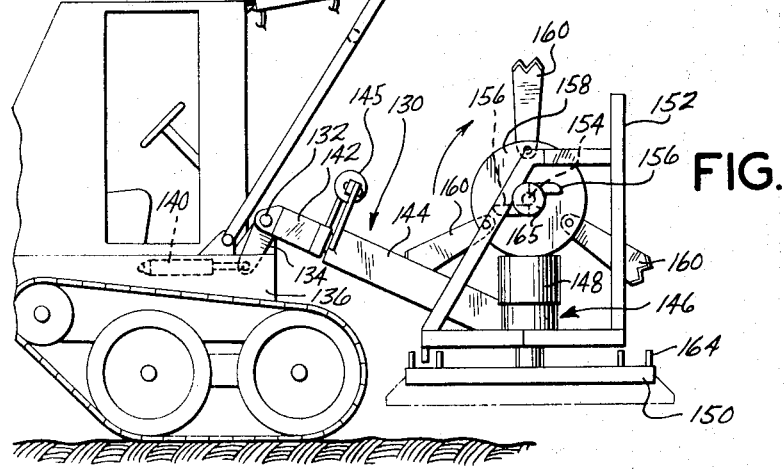
FIG. 14 is an elevation view of a second embodiment of the land clearing apparatus.

Referring now to FIGS. 14 and 15, another embodiment of the present invention is shown. A boom, generally designated 130, is pivotally attached for vertical movement on pin 132 connected to flanges 134 on the forward frame 136 of a tracked vehicle 138. The boom 130 is powered for vertical movement by a hydraulic cylinder mechanism 140 mounted between the boom 130 and the frame 136. The boom 130 includes two sections 142 and 144. Boom section 144 is journaled about a longitudinal axis on boom section 142. Boom section 142 is powered for rotation about this longitudinal axis by hydraulic cylinder mechanism 145.

The forward section 144 of the boom 130 includes two arms which diverge from each other. Mounted on each of the free ends of the arms is a cutter head 146. Cutter head 146 includes a hydraulic motor 148 which drives a vertically journalled shaft similar to that described above. Connected to the shaft are a pair of generally horizontally rotating cutter wheels 150. These cutter wheels 150 can be similar in constuction to those described above, having cutting teeth on the bottom, peripheral and top surfaces thereof. An upstanding frame 152 is also interconnected with the arms of boom 144. A shaft 154 extending laterally across the top of the cutter heads 146 is journaled in suitable bearing blocks mounted on the vertical frame 152. A plurality of feeder teeth 156 are mounted a spaced distance from each other across the lateral extent of shaft 154. Hub 158, attached to one end of shaft 154, has three radially extending blades 160 mounted thereon. An outer guard plate 162 is also attached to the upstanding frame 152. Plate 162, attached to frame 152, is positioned slightly above the cutting teeth 164 on the top surface of the cutting wheels 150. Shaft 154 is driven by hydraulic motor 165.

In operation the cutting wheels are driven by the hydraulic motors 148 in the direction indicated by arrows 166. As the cutting wheels 150 are advanced through an area to be cleared the brush will be driven laterally across the cutting wheels in the direction of arrows 166. Brush will be trapped by the plate 162, to insure comminution or chopping by the teeth 164 mounted on top of wheels 150. The feeder teeth 156 mounted on shaft 154 will feed high standing brush into or onto the tops of the cutter wheels 150.

The blades 160, rotating in a substantially vertical plane, will cut a swath through brush, trees and the like so that a relatively straight path is formed as the apparatus advances through an area to be cleared. Thus on a second pass through the area to be cleared, a relatively vertical line will have been demarked and cleared to facilitate traverse across as large a swath as possible.

Also provided in this embodiment of the invention is guard frame 168 pivotally mounted to the vehicle frame 136 above the vehicle 138. The guard frame 168 includes two vertically extending structural members 170. A plurality of cross bars 172 are attached to members 170. Guard frame 168 will prevent tall trees and the like from falling onto the operator's cab of the vehicle 138. Furthermore the frame will direct brush and trees downwardly onto the tops of the cutting wheels 150 to be chopped. Frame 168 can be adjsuted fore or aft by means of hydraulic cylinder mechanism 174 operatively attached between the vehicle 138 and the guard frame 168. Thus, if a tall tree is encountered the guard frame 168 can be moved to a position above the upstanding framework 152 to ensure that a tree being cut through by the cutter wheels 150 will fall away from the vehicle.

As an alternate to the embodiment described immediately above, the apparatus illustrated in FIG. 17 can be employed. Two booms 180 and 182 are separately pivotally mounted on a vehicle frame 184 along shaft 186. Booms 180 and 182 are repectively powered for vertical movement by the hydraulic cylinder mechanisms 188 and 190. Cutting wheels 192 and 194 are mounted, respectively, on the ends of the booms 180. Thus the booms 180 and 182 can be separately manipulated so that the cutting wheels 192 and 194 can be adjusted to suit any particular obstacles or terrain which the apparatus might encounter.

Figure 16:
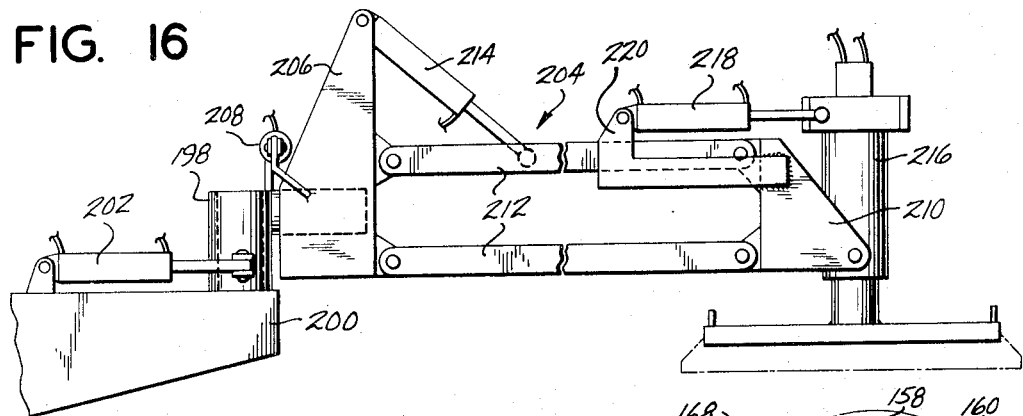
FIG. 16 is an elevation view of a third embodiment of the land clearing apparatus.

As an alternate to the boom illustrated in FIGS. 1 and 2, the boom of FIG. 16 utilizes a parallel linkage to maintain the cutting head in a preadjusted position. Base member 198 of the boom is attached for pivotal movement about a vertical standard mounted on a vehicle frame 200. The base member 198 is powered for movement about this vertical axis by hydraulic cylinder mechanism 202. The boom 204 includes a rear plate 206 journaled for rotation about a horizontal axis on the base member 198. Hydraulic cylinder 208 powers the movement of the plate 206 about the horizontal axis. A forward plate 210 is connected to the rear plate 206 by a pair of parallel links 212 each pivotally mounted to the plates 206 and 210 at their ends. A hydraulic cylinder 214 connected between plate 206 and one of the links 212 adjusts the height of plate 210 with respect to the vehicle frame 200. A cutting head 216 is pivotally mounted on the forward plate 210. Thus as the boom 204 is raised and lowered the cutting head will maintain its same relative orientation with respect to the vehicle frame 200. A hydraulic cylinder 218 is connected between the cutting head 216 and a flange 220, connected to the forward plate 210. If it is desired to adjust the orientation of the cutting head with respect to the vehicle frame 200, hydraulic cylinder 218 powers this function.

FIG. 18 illustrates another embodiment of the invention employing a plurality of cutting wheels. As shown, three cutting wheels 211 are mounted on a boom 222, which is in turn pivotally mounted on a vehicle for pivotal up and down movement about an axis transverse to the fore and aft dimension of the boom. The cutting wheels are mounted from right to left at locations serially closer to the vehicle. As the cutting wheels rotate in a counterclockwise direction, wood chips and other material disintegrated by the wheels are fed in the direction of arrow 223 to a windrowing apparatus 225 mounted on the side of the vehicle. The windrowing apparatus carries the chips and other material rearwardly along the vehicle and deposits them on the ground in a windrow.

FIGS. 19 through 26 illustrate another embodiment of the mounting block and cutting teeth for use with the cutting wheel described in the previous FIGURES. Referring first to FIGS. 19 and 20, the mounting block 224 is cut from steel bar stock. A bottom flat edge 226 is provided for welding or other suitable affixation to the cutting wheel. The mounting block 224 is designed for mounting to face in the direction of arrow 228. Leading edge 230 of the mounting block 224 contains a cutting surface formed by bevelling the forward end of the block 224. The top surface 232 of the mounting block 224 is parallel with bottom surface 226 along its first portions but then tapers downwardly and rearwardly to the rear edge 234 of the block 224. An angular slot 236 is cut in block 224 which runs rearwardly and downwardly from its forward apex. A series of semicylindrical grooves 238 are also provided on one side of the slot 236.

The grooves 238 mate with grooves 240 in teeth 242 shown in FIGS. 21, 22 and 23. Referring to those FIGURES the tooth 242 is provided with a longitudinal groove 244 along one side thereof. The longitudinal groove 244 mates with the edge 246 (FIG. 19) in the groove 236 of mounting block 224. Suitable fasteners such as bolts are utilized to hold the tooth 242 in the mounting block by inserting the bolts into the cylindrical opening provided by mating grooves 240 and 238. Grooves 240 can be mated at various positions with the grooves 238 to provide longitudinal adjustment of the tooth 242 within the mounting block 224. As can be seen, the teeth 242 have a forward cutting edge 248 which serves the same purpose as the cutting edge of the teeth previously described.

FIGS. 24, 25 and 26 illustrate an alternate embodiment of the teeth described in conjunction with FIGS. 21 through 23. The difference in this tooth is that the cutting edge 250 is offset so that its apex coincides with one of the sides of the groove 244. Tooth 252 provides a cutting surface which has a longer bevel on one side than the other. This cutting edge is advantageous for certain applications.

Referring now to FIGS. 27 and 28 a further embodiment of the cutting head of the present invention is illustrated. This embodiment will provide better pulverization, i.e., smaller particles, thus producing better material for a skid trail road. The possible need for a second run across the same area is also eliminated. In this embodiment the cutting head 260 is mounted on a boom 262. A shaft 264 is journaled along a generally vertical axis in the head. The cutting wheel 266 is attached to the bottom free end of the shaft 264. A second cutting head 268 is attached to head 260 by flange 270. A shaft 272 is journaled in the cutting head 268 while a second cutting wheel 274 is mounted on the free end of shaft 272. Shaft 272 is mounted on a generally horizontal axis allowing the second cutting wheel 274 to rotate in a generally vertical plane. Both cutting heads 260 and 268 are driven by appropriate hydraulic motors 276 and 278.

In operation, cutting wheel 266 will be driven in the direction of arrow 280. Cutting heads are moved generally in the direction of arrow 282 by movement of the vehicle to which boom 262 is attached. Brush and trees will be severed by teeth 283 on the forward edge of cutting wheel 266. Brush falling on the top of the cutting wheel 266 will be driven against the cutting wheel 274 by the rotation of the wheel 266 and the teeth 284. The second wheel 274 is mounted for rotation in the direction of arrow 286. Wheel 274 has teeth 288 on its peripheral edges as well as teeth 289 mounted on its forward facing surface. The coaction of the two cutting wheels 266 and 274 can produce a much smaller particle size than the previous embodiments. Furthermore, because of the additional cutting wheel this embodiment will more quickly chop brush and other debris into small pieces.

The teeth spacing and arrangement on both cutting wheels 266 and 274 can be similar to that described above. In this embodiment the upper surface of the cutting wheel 266 is preferably dish-shaped. The cutting wheel 266 has teeth 284 mounted both on the lip of the dish and on the periphery of the dish. The spacing between the locus of lines circumscribed by teeth 288 on wheel 274 and the lines circumscribed by teeth 284 on wheel 266 will be essentially equidistant from each other, contributing to a relatively uniform particle size produced by the wheels.

Another embodiment of the cutting wheel similar to that shown in FIGS. 27 and 28 is illustrated in FIGS. 29 and 30. In this embodiment a second cutting wheel 290 is mounted for rotation in a generally vertical plane. However this vertical plane of rotation lies parallel to the longitudinal direction of the mounting of the boom 292. Wheel 290 has teeth on both the left and right facing surfaces thereof. As the horizontal wheel 294 rotates in the direction of arrow 296, debris will be driven into the face 298 of wheel 290 chopping the material to a relatively small particle size. Furthermore, teeth are provided on the opposing surface 300 of the vertically rotating wheel 290 to provide a secondary pulverizing action for brush entering the wheel from the side.

FIGS. 31 and 32 illustrate embodiments of the cutting wheel which can be utilized with an articulated boom as an alternative for the cutting wheels previously described. The cutting wheel shown in FIGS. 31 and 32 provides a greater vertical cutting swath than can be achieved by the above described cutting wheels. As will be noted the cutting wheel 302 shown in FIGS. 31 and 32 is hollow. This construction is necessitated by weight conservation considerations. Although it is desirable that that cutting wheel be relatively massive, weight limitations are encountered when considering that one of the primary purposes of the present invention is for mounting of the cutting wheel on a relatively small log skidding vehicle.

The cutting wheel 302 is composed of a top plate 304 having downwardly extending annular flanges 306 thereon. A bottom plate 308 is connected to the top plate 304 via upstanding annular flanges 310. Suitable fasteners are utilized to interconnect the top plate 304 to the bottom plate 308. Teeth 312 are mounted as before in varying positions on the bottom, periphery, and top of the cutting wheel 302. This cutting wheel can be mounted on a shaft 314 identically or similarly to those described above.

FIG. 33 illustrates another embodiment of the cutting wheel shown in FIGS. 31 and 32. In this embodiment the peripheral portions of the cutting wheel are rounded to provide a better surface for mounting the teeth 318 on the wheel 316.

FIG. 34 illustrates yet another embodiment of the cutting wheel of the present invention. Cutting wheel 320 includes an upper disc-shaped plate 322 connected to shaft 324. Teeth 326 are mounted on the upper surface of plate 322. A frustoconically-shaped lower section 328 is connected by suitable fasteners to the plate 322 around its periphery. Teeth 330 are appropriately fastened to the frustoconical surfaces of the bottom section 328. An advantage of this configuration is that the wheel can be canted, leaving a rotating surface generally parallel with the ground being cleared, while yet providing a vertically-extending surface for cutting into the sides of logs and the like. By orienting wheel 320 generally horizontal the peripheral cutting teeth 332 present a relatively thin cutting edge. Thus, they can be utilized to cut through thick objects such as trees while consuming a smaller amount of power than would be required by the previously illustrated embodiments.

Figure 35:
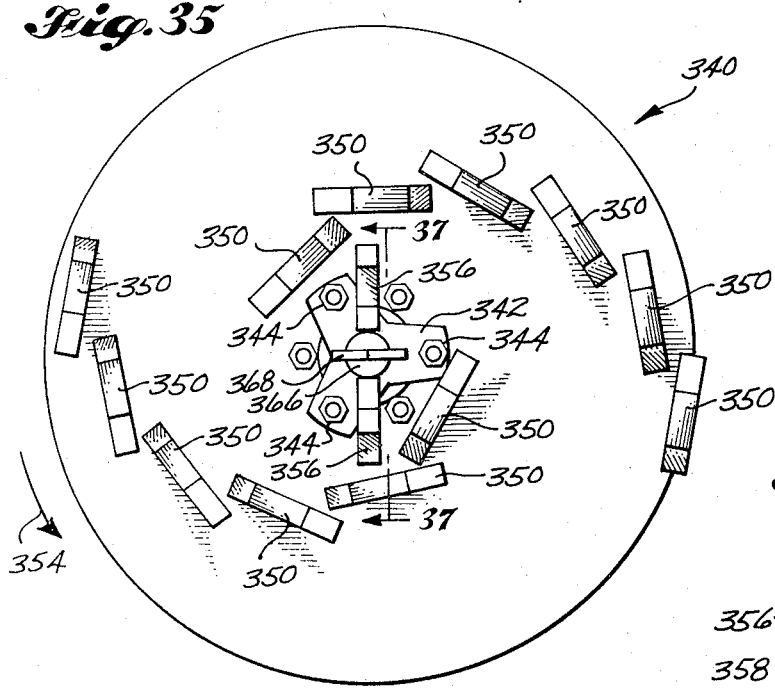
FIGS. 35, 36, and 37 are bottom and elevation views of a first embodiment of the planting site preparation apparatus of the present invention.
Figure 37:
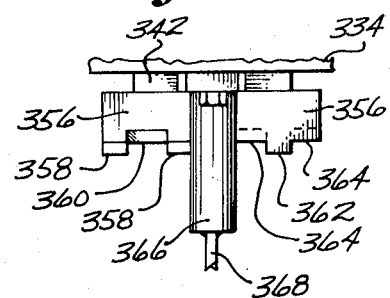
Figure 36:
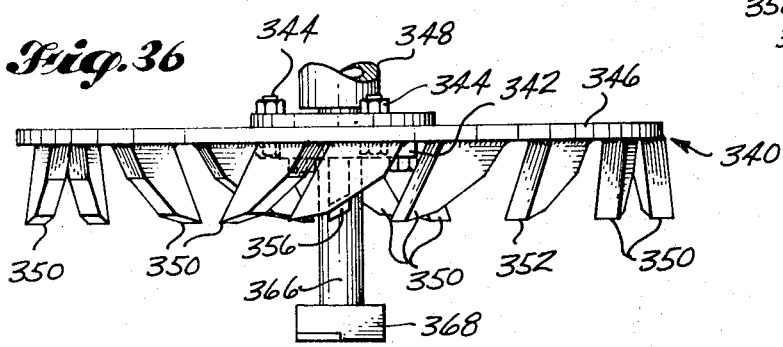

In accord with another embodiment of the present invention a tree site preparation wheel is provided as an attachment to the articulated boom described in conjunction with FIGS. 1 and 2. Referring to FIGS. 35, 36 and 37, a first embodiment of the site preparation wheel, generally designated 340, includes a central hub 342 affixed by fasteners 344 to a circular disc 346. Hub 342 is attached to a shaft 348 which is in turn journaled in a bearing block of a head similar to the cutter heads shown in the previous figures. The disc 346 is preferably a relatively massive steel plate 1 inch thick by approximately 36 to 72 inches in diameter. A plurality of rock cutting teeth 350 are welded to the bottom surface of the disc 346. The rock teeth 354 are also relatively massive; for example, they can be manufactured from 1 inch steel plate. Teeth 354 extend downwardly from the point of attachment to plate 346 6 to 12 inches to the cutting edges 352. It will be noted that the teeth 350 slope backwardly from the cutting edges 352 to the point of attachment to the disc 346. This configuration provides better digging and uprooting action as the site preparation wheel is rotated in the direction of arrow 354.

In operation, when the site preparation wheel 340 contacts the ground to be prepared for planting of a tree, the dirt is worked and rocks are loosened and thrown from the site. Since the teeth 350 are arranged in a spiral pattern from adjacent the hub 342 to the periphery of the disc 346, their effective working area is approximately the same as the area of disc 346.

Site preparation wheel 340 also has a pair of teeth 356 mounted adjacent the hub 342 and extending radially outwardly from the hub 342. One of teeth 356 has a pair of cutting edges 358 at the ends thereof with a recessed portion 360 in the center. The opposing tooth has a cutting edge 362 in the center with recessed portions 364 at its edges. Teeth 356 work the ground adjacent the hub. A central shaft 366 is also coaxially mounted on the hub 342. A single blade 368 is mounted at the end of the shaft 366. Blade 368 provides a drill-like guiding action for the entire wheel as it is brought into contact with the site being prepared. Since blade 368 enters the site being prepared first and travels to a depth of 1 foot or more prior to the time the rock cutting teeth 350 enter the ground, the central shaft 366 and teeth 368 assist to restrain lateral movement of the wheel as the rock teeth 350 begin to work the site.

Figure 38:
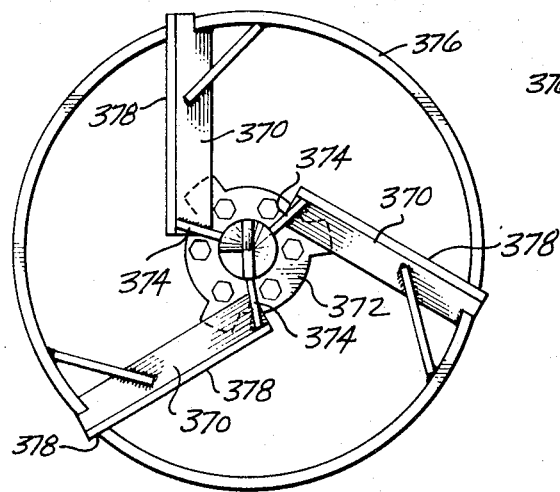
FIGS. 38 and 39 are bottom and partial cross-sectional views, respectively, of a second embodiment of the site preparation wheel.
Figure 39:
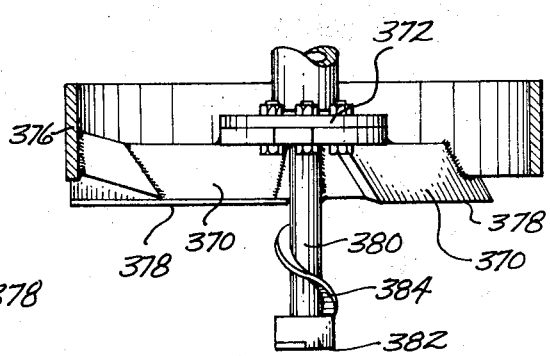

In a second embodiment of the site preparation wheel shown in FIGS. 38 and 39 three elongate blades 370 are attached by welding or other suitable affixation means to hub 372. Reinforcing flanges 374 interconnect the blades 370 and hub 372. An annular shroud 376 is attached to the blades 370 near their outer ends. The cutting edges 378 of the blades extend below the bottom surface of the shroud 376 to allow for working of the site before the shroud 376 contacts the site. In this embodiment the shroud serves the purpose of retaining the dirt being worked within the site. Certain types of trees and certain geographic locations require loose ground for planting as opposed to the ground prepared by the site preparation wheel 340 of FIGS. 35 through 37.

A central shaft 380 is attached to the hub 372. Central shaft 380 has teeth 382 mounted on the bottom thereof and also has a spiral auger 384 attached to its periphery. As above, the action of the teeth 382 initially breaks the ground. In this embodiment dirt is worked and forced upwardly by the auger 384 from the center of the site preparation wheel to provide a deep central hole in which a tree can be planted.

The embodiment of the invention shown in FIGS. 40 and 41 combine the advantages of both of the previous embodiments of the site preparation wheel. In this embodiment a disc 388 is connected to a central hub 390. A pair of radially positioned teeth 392 (similar to teeth 356 of FIG. 37) are mounted adjacent the hub. Likewise a ground breaking shaft 394 and tooth 396 are mounted coaxially on the hub 390. Three elongate blades 398 are welded or otherwise suitably fastened to the bottom surface of the disc 388. Flanges 400 reinforce the rear sides of the blades 398. Rock cutting teeth 402 are arranged in a spiral pattern in pairs of two between the elongate blades 398. These teeth have their cutting edges 404 extending below the cutting edges 406 of the blades 398. The rock cutting teeth 402 will thus initially till the ground and the elongate blades 398 will pick up the dirt loosened by the rock cutting teeth and throw it outwardly from the wheel.

The embodiment of the invention illustrated in FIGS. 42 and 43 is similar to the embodiment shown in the previous two figures. In this embodiment the elongate blades 408 have a cutting edge which is parallel to the bottom surface of the disc 410 on which they are mounted.

The embodiment of the site preparation wheel shown in FIGS. 44 and 45 is similar to that shown in FIGS. 38 and 39. In this embodiment three blades 412 are connected to a central hub 414. The blades have their center line extending radially from the hub 414. The shaft 416 and initial ground breaking teeth 418 are provided to excavate the hole for the planting of the tree. This embodiment is intended for use where the ground is not rocky, thus no rock cutting teeth are provided. In addition, this wheel does not have the mass separated from the hub as the previous embodiments do. Thus the rotational momentum of the wheel will not be as high preventing its use in preparation of ground where a high momentum wheel would be required. This embodiment is designed not to retain dirt at the tree preparation site, but is designed to throw it outwardly from the site.

The ground cutting blades described in conjunction with the embodiments of FIGS. 38 through 48 all have a relatively straight and sharp cutting edge. Variations of this cutting edge are shown in FIGS. 46, 47 and 48. As can be seen, the cutting edge of the blade 420 in FIG. 46 is scalloped to provide not only a shearing but a slicing or cutting action in the ground. Likewise, the serrated blade 422 shown in FIG. 47 will provide substantially the same function as that shown in the previous FIGURE. The blade 424 shown in FIG. 48 will provide a tearing action as well as a tilling action as it rotates or passes through the soil in the site being prepared. This blade can be utilized where there are a great number of smaller rocks in the soil. Blade 424 will not become dull as fast as the other blades disclosed and furthermore will uproot rocks more easily than a blade with a straight, scalloped or serrated edge. Blade 424 is formed from a plate 426 having a plurality of teeth 428 mounted thereon. The plate 426 has no cutting edge but is relatively flat along its edge 430. Teeth 428 provide all of the cutting and working action of this blade.

A further embodiment of the tree site preparation wheel of the present invention is shown in FIGS. 49 and 50 in partially broken-away elevation and plan views. This embodiment of the invention is similar to that shown in FIGS. 38 and 39. However, in this embodiment the shroud 440 has a lesser height than that shown in those FIGURES. A plurality of blades 442 preferably three, radiate from a central hub (not shown). The central hub is adaptable to be connected to a rotatable shaft on a cutter head or tree site preparation head. The blade 442 is canted rearwardly from the direction of rotation 444 of the wheel. A cutting edge 446 is provided at the bottom edge of the blade 442. In this embodiment a triangularly shaped plate 448 is provided adjacent the shroud 440 and outer end of the blade 442. The plate 448 is suitably fastened as by welding to the upper edge of blade 442 and to the inside of the upper portion of the shroud 440.

In operation as earth is removed from the tree site being prepared, the earth will pass upwardly over the rearward edge of the blade 442. Also, due to the centrifugal force applied to the loosened earth, it will tend to ride outwardly toward the shroud 440. Normally the shroud 440 would retain most of the worked earth since it would either encounter it before it reached the outer top edge of the blade 442 or would drop over the top edge of the blade 442, thus falling again within the shroud. Plate 448 is provided to prevent the earth moving outwardly on the blade 442 from being retained by the shroud. As the earth passes over the top outer edge of the blade 442 it will encounter plate 448 and will be thrown radially outwardly from the site preparation wheel by centrifugal force.

Although the present invention has been described in relation to several embodiments, it will be understood that various alterations, substitutions of equivalents and other changes can be made to the embodiments disclosed by one of ordinary skill in the art without departing from the original concept of the invention. It is intended that the invention be limited only by the definition contained in the appended claims.

What is claimed is:

1. A land clearing apparatus comprising:
   articulated support means for attachment at one end to a land vehicle, said support means including an elongate boom having a free end,
   a cutting wheel carrier attached to the free end of said boom, a shaft journaled in said carrier,
   cutting wheel means affixed to said shaft, said wheel means comprising a plate having a plurality of cutting members affixed to the bottom and on the periphery thereof and projecting from said wheel,
   motor means for rotating said shaft mounted on said carrier, and
   a cutting member mounted on the top of said plate and projecting upwardly therefrom.

2. The apparatus of claim 1, said wheel means further comprising:
   a plurality of cutting members mounted on the top of said plate and projecting upwardly therefrom.

3. The apparatus of claim 2, wherein said plate is a disc, said cutting members being mounted on the bottom of said disc in a spiral configuration.

4. The apparatus of claim 3 wherein said cutting members are mounted on the periphery of said disc at varying angles with respect to the plane of said disc.

5. The apparatus of claim 4 wherein said support means and said wheel carrier further comprise:
   a base member capable of being attached to said vehicle for pivotal movement about a first axis generally perpendicular to the horizontal plane of said vehicle, said boom pivotally mounted to said base member about a second axis generally transverse to said first axis, said boom comprising a first section and a second section, said first section pivotally mounted on said second section about a third axis generally perpendicular to said second axis, said wheel carrier being pivotally mounted to the free end of said boom about a fourth axis generally parallel to said second axis, and
   hydraulic cylinder means for rotating the portions of said support means about the respective axes, said motor means comprising a hydraulic motor.

6. The apparatus of claim 5 wherein the second section of said boom comprises two end plates, one of which is pivotally mounted on said first section and the other of which is pivotally connected to said wheel carrier, and a pair of parallel links pivotally connecting said end plates.

7. The apparatus of claim 2 wherein the locus of lines circumscribed by the cutting edges of said teeth cover a substantial portion of the effective area of said wheel.

8. The apparatus of claim 4 wherein said support means is mounted on said vehicle to swing generally laterally from side-to-side to cover a cutting swath wider than said vehicle.

9. Land clearing apparatus comprising:
   a land vehicle having ground engaging motive means thereon,
   boom means mounted at one end on said vehicle, said boom means including a first bearing block mounted on the free end thereof, said bearing block having a first shaft journaled therein for rotation about a first axis, said boom means being adjustable to vary the orientation of said shaft from a substantially vertical position to various angular positions relative to the orientation of said vehicle,
   first cutting wheel means mounted on said shaft, said first cutting wheel means having a plurality of teeth mounted on the bottom, and periphery thereof and projecting from said wheel at spaced locations thereon,
   hydraulic motor means for rotating said first shaft mounted on said bearing block,
   said boom means further comprising a second bearing block mounted on the free end thereof and having a second shaft journaled therein for rotation about a second axis generally transverse to said first axis,
   a second cutting wheel means mounted on said second shaft and positioned above said first cutting wheel means, said second cutting wheel means having a plurality of teeth mounted on the periphery thereof, the cutting edges of said teeth being spaced from said first cutting wheel means, and
   hydraulic motor means for rotating said second shaft.

10. The apparatus of claim 9 further comprising:
    a plurality of said boom means mounted on said vehicle, each of said boom means having a cutting wheel means mounted thereon.

11. The apparatus of claim 10 wherein said boom means are interconnected to move together in a vertical plane.

12. The apparatus of claim 10 wherein each of said boom means are mounted for independent movement on said vehicle.

13. The apparatus of claim 9 wherein said boom means comprises a plurality of said bearing blocks each having rotatively mounted shafts therein, each of said shafts having a cutting wheel means mounted thereon.

14. The apparatus of claim 9 wherein said boom means has a longitudinal dimension and wherein said second shaft is oriented generally longitudinally with respect to said boom means.

15. The apparatus of claim 9 wherein said second shaft is oriented generally transversely with respect to said boom means.

16. The apparatus of claim 15 further comprising:
    a third bearing block mounted on the free end of said boom and having a third shaft mounted therein for rotation about a third axis generally parallel to said first axis,
    third cutting wheel means mounted beside said first cutting wheel means on said third shaft, said second shaft extending laterally across and above said first and third wheel means, said second shaft having a plurality of feeder teeth mounted thereon, and hydraulic motor means for driving said third shaft.

17. The apparatus of claim 16 further comprising:
a guard frame mounted on said vehicle having at least its lower portion positioned rearwardly of said first and third wheel means and extending upwardly from said vehicle, said guard frame extending substantially across the lateral extent of said first and third cutting wheel means.

18. The apparatus of claim 17 wherein said guard frame is pivotally mounted along a generally transverse axis with respect to said vehicle, said apparatus further comprising hydraulic cylinder means for pivoting said guard frame about said generally transverse axis.

19. A brush and tree clearing cutting wheel comprising:
mounting plate means including a hub capable of attachment to a rotatable shaft, said mounting plate means having a generally circular shape and having top, bottom and peripheral portions,
a first plurality of cutting teeth mounted on the bottom portion of said mounting plate means,
a second plurality of cutting teeth mounted on the peripheral portion of said mounting plate means,
a third plurality of cutting teeth mounted on the top portion of said mounting plate means.

20. The wheel of claim 19 wherein said mounting plate means comprises a massive disc-shaped plate, said apparatus further comprising:
a first plurality of tooth-mounting blocks affixed to the bottom portion of said plate, said first plurality of teeth being removably fastened on said first plurality of mounting blocks, said first plurality of mounting blocks arranged in a spiral pattern on said bottom portion,
a second plurality of mounting blocks affixed to the peripheral portion of said plate, said second plurality of teeth removably fastened thereto, said second plurality of mounting blocks serially positioned at varying angles with respect to the plane of said plate.

21. The wheel of claim 20 wherein said third plurality of teeth comprise:
a first set of teeth affixed to the top portion of said plate adjacent the periphery thereof, said first set of teeth having the cutting edges thereof arranged at an angle to the plane of said plate, and
a second set of teeth affixed to the top portion of said plate spaced radially inwardly from the periphery thereof, said second set of teeth having the cutting edges thereof arranged substantially parallel to the plane of said plate.

22. The wheel of claim 20 wherein each of said first and second sets of teeth are of a generally parallelepiped shape extending outwardly in a longitudinal direction from said plate, said teeth having two parallel cutting edges, a first of said cutting edges generally parallel with the plane of said disc and spaced therefrom, said second cutting edge being a reserve cutting edge contacting the bottom portion of said disc.

23. The wheel of claim 20 wherein said mounting blocks comprise:
a relatively flat holder having one edge fixed to said disc, said holder having a generally vertically extending cutting surface along its leading edge, said holder having a slot extending from the forward apex thereof rearwardly and inwardly,
said first and second sets of teeth comprising a bar having a longitudinal groove therein, said groove mating with one side of said slot, the side of said bar opposite said groove mating with the other side of said slot, an end portion of said bar projecting out of said slot and forwardly of said holder, said end portion having a cutting surface thereon,
means for removably fixing said tooth in said holder.

24. The wheel of claim 19, said mounting plate means comprising:
a top section having a generally circular shape and having an annular flange extending downwardly therefrom,
a bottom section having a generally circular shape and having an upwardly extending annular flange thereon, said annular flanges including means for interconnection thereof,
the pluralities of cutting teeth mounted on the bottom surface of said bottom section, on the peripheral portion formed by said annular flanges, and on the top surface of said top section.

25. The wheel of claim 19, said mounting plate means comprising:
a top disc-shaped section,
a hollow frustoconically shaped bottom section, said top and bottom sections having means for interconnection thereof,
the pluralities of cutting teeth mounted on the conically shaped exterior surface of said bottom section and on the top surface of said top section.

26. The wheel of claim 19 further comprising mounting blocks affixed to the bottom and peripheral portions of said wheel, said teeth removably mounted on said blocks, said blocks being massive relative to said teeth, said mounting blocks having a leading edge positioned forwardly of the leading edge of said teeth.

27. A land clearing head for mounting on a movable boom affixed to a vehicle comprising:
mounting block means for connection to said boom, a first shaft journaled in said mounting block means having a generally vertical orientation,
a first cutting wheel mounted on said first shaft for rotation generally in a horizontal plane, said cutting wheel having a plurality of cutting teeth affixed to the bottom, peripheral and top portions thereof, the thickness of said cutting wheel being relatively small relative to the diameter thereof, and motor means mounted on said mounting block for rotating said shaft.

28. The clearing head of claim 27 further comprising:

a second shaft journaled in said mounting block means above said first shaft, said second shaft oriented generally perpendicularly to said first shaft, a second cutting wheel mounted on said second shaft for rotation generally in a vertical plane, said second cutting wheel located on said second shaft above said first cutting wheel and having at least a portion of the plane of rotation thereof within the periphery of said second wheel,
a plurality of cutting teeth mounted on said second cutting wheel on the periphery thereof and on the surface thereof nearest the mounting block means.

29. The clearing head of claim 28 wherein the cutting teeth mounted on the top surface of said first cutting wheel nearest the periphery thereof project upwardly a greater distance than the cutting teeth mounted radially inwardly therefrom, the locus of points defined by the cutting edges of the teeth on said second cutting wheel being spaced substantially equidistantly from the locus of points defined by the cutting edges of teeth on the top surface of the first wheel.

30. A clearing, thinning and slash disposal apparatus comprising:

support means capable of being attached to a land vehicle, an elongate boom having a free end and a supported end, first means mounting the supported end of said boom to said support means for pivotal movement about a first axis transverse to said boom, said first axis so oriented relative to said support means to mount said free end for movement in a vertical direction, second means mounting the supported end of said boom to said support means for pivotal movement about a second axis transverse to said first axis, said second axis so oriented relative to said support means to mount said free end for movement in a lateral direction, a tool carrier, third means mounting said tool carrier to the free end of said boom for pivotal movement about a third axis transverse to said boom, and means cooperating with said boom and said tool carrier for selectively positioning said tool carrier at various angular positions relative to said boom, a disc-shaped cutting tool mounted for rotation on said tool carrier about a fourth axis transverse to said third axis, said tool having a bottom and a periphery, said tool having a plurality of cutting members affixed to the bottom and the periphery thereof and projecting therefrom, motor means for rotating said cutting tool mounted on said tool carrier.

31. The apparatus of claim 30 further comprising:

fourth means mounting said supported end of said boom for pivotal movement about a fourth axis oriented generally along the elongate dimension of said boom thereby mounting said free end of said boom for rolling movement about said fourth axis.

32. The apparatus of claim 30 further comprising:

a land vehicle having ground engaging means motive means thereon, said support means being affixed to said vehicle.

33. The apparatus of claim 30 wherein said cutting tool has a top and further comprises:

means formed on the top of said cutting tool, said means being so constructed to prevent debris falling thereon from becoming lodged on the top of said cutting tool and to assist in removal of debris therefrom as said tool rotates in said carrier.

* * * * *